US011243397B2

(12) United States Patent
Gollier et al.

(10) Patent No.: US 11,243,397 B2
(45) Date of Patent: Feb. 8, 2022

(54) OPTICAL ASSEMBLY WITH POLARIZATION VOLUME HOLOGRAPHIC ELEMENT

(71) Applicant: FACEBOOK TECHNOLOGIES, LLC, Menlo Park, CA (US)

(72) Inventors: Jacques Gollier, Bellevue, WA (US); Brian Wheelwright, Sammamish, WA (US); Scott Charles McEldowney, Redmond, WA (US); Yusufu Njoni Bamaxam Sulai, Bothell, WA (US); Babak Amirsolaimani, Redmond, WA (US); Ying Geng, Bellevue, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 305 days.

(21) Appl. No.: 16/221,319

(22) Filed: Dec. 14, 2018

(65) Prior Publication Data

US 2019/0353906 A1  Nov. 21, 2019

Related U.S. Application Data

(60) Provisional application No. 62/673,807, filed on May 18, 2018.

(51) Int. Cl.
| | | |
|---|---|---|
| *G02B 27/01* | (2006.01) | |
| *G02B 27/14* | (2006.01) | |
| *G03H 1/02* | (2006.01) | |

(52) U.S. Cl.
CPC ....... *G02B 27/0172* (2013.01); *G02B 27/144* (2013.01); *G03H 1/0248* (2013.01);
(Continued)

(58) Field of Classification Search
CPC .............. G02B 27/0172; G02B 27/144; G02B 2027/013; G02B 2027/0123;
(Continued)

(56) References Cited

U.S. PATENT DOCUMENTS

| | | |
|---|---|---|
| 5,715,023 A | 2/1998 | Hoppe |
| 2002/0021499 A1 | 2/2002 | Roest |

(Continued)

FOREIGN PATENT DOCUMENTS

| | | |
|---|---|---|
| EP | 0718645 A2 | 6/1996 |
| WO | 2017136448 A1 | 8/2017 |

OTHER PUBLICATIONS

Facebook Technologies, LLC, International Search Report and Written Opinion, PCT/US2019/022471, dated Jul. 2, 2019, 12 pgs.
(Continued)

*Primary Examiner* — Kimberly N. Kakalec
(74) *Attorney, Agent, or Firm* — Morgan, Lewis & Bockius LLP

(57) ABSTRACT

An optical assembly includes a partial reflector that is optically coupled with a first polarization volume holographic element. The partial reflector is capable of receiving first light having a first circular polarization and transmitting a portion of the first light having a first circular polarization. The first polarization volume holographic element is configured to receive the first portion of the first light and reflect the first portion of the first light as second light having the first circular polarization. The partial reflector is capable of receiving the second light and reflecting a first portion of the second light as third light having a second circular polarization opposite to the first polarization. The first polarization volume holographic element is configured to receive the third light having the second circular polarization and transmit the third light having the second circular polarization.

22 Claims, 12 Drawing Sheets

(52) U.S. Cl.
CPC .............. *G02B 2027/013* (2013.01); *G02B 2027/0123* (2013.01); *G02B 2027/0174* (2013.01)

(58) Field of Classification Search
CPC ...... G02B 2027/0174; G02B 2027/015; G02B 2027/0178; G02B 5/32; G02B 5/3016; G02B 27/0101–0103; G02B 27/017; G02B 27/28; G02B 27/281; G02B 27/286; G02B 2027/0105–0107; G03H 1/0248; G03H 2240/15
See application file for complete search history.

(56) References Cited

U.S. PATENT DOCUMENTS

| | | |
|---|---|---|
| 2012/0236030 A1 | 9/2012 | Border et al. |
| 2015/0378074 A1 | 12/2015 | Kollin et al. |
| 2016/0002743 A1 | 9/2016 | Cheng et al. |
| 2017/0227777 A1* | 8/2017 | Carollo .............. G02B 27/0176 |
| 2018/0039052 A1 | 2/2018 | Khan et al. |
| 2019/0265494 A1* | 8/2019 | Takagi ................... G02B 27/28 |
| 2019/0285902 A1* | 9/2019 | Ouderkirk .......... G02B 27/0955 |

OTHER PUBLICATIONS

Extended European Search Report for European Application No. 19802555.3, dated May 3, 2021, 10 Pages.

International Preliminary Report Patentability for International Application No. PCT/US2019/022471, dated Dec. 3, 2020, 10 Pages.

Kobashi J., et al., "Planar Optics with Patterned Chiral Liquid Crystals," Nature Photonics, Apr. 11, 2016, XP055507505, pp. 1-5.

* cited by examiner

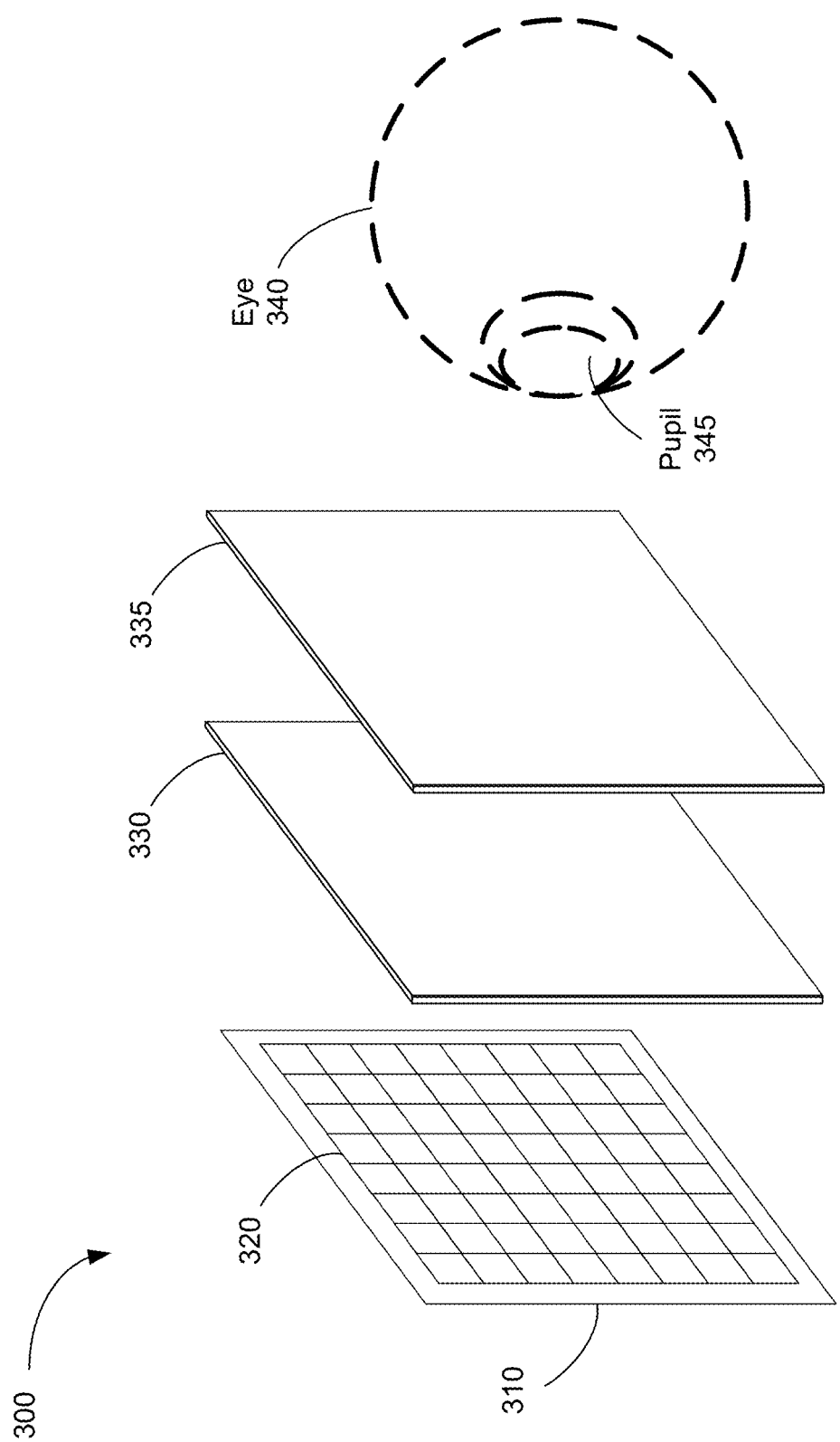

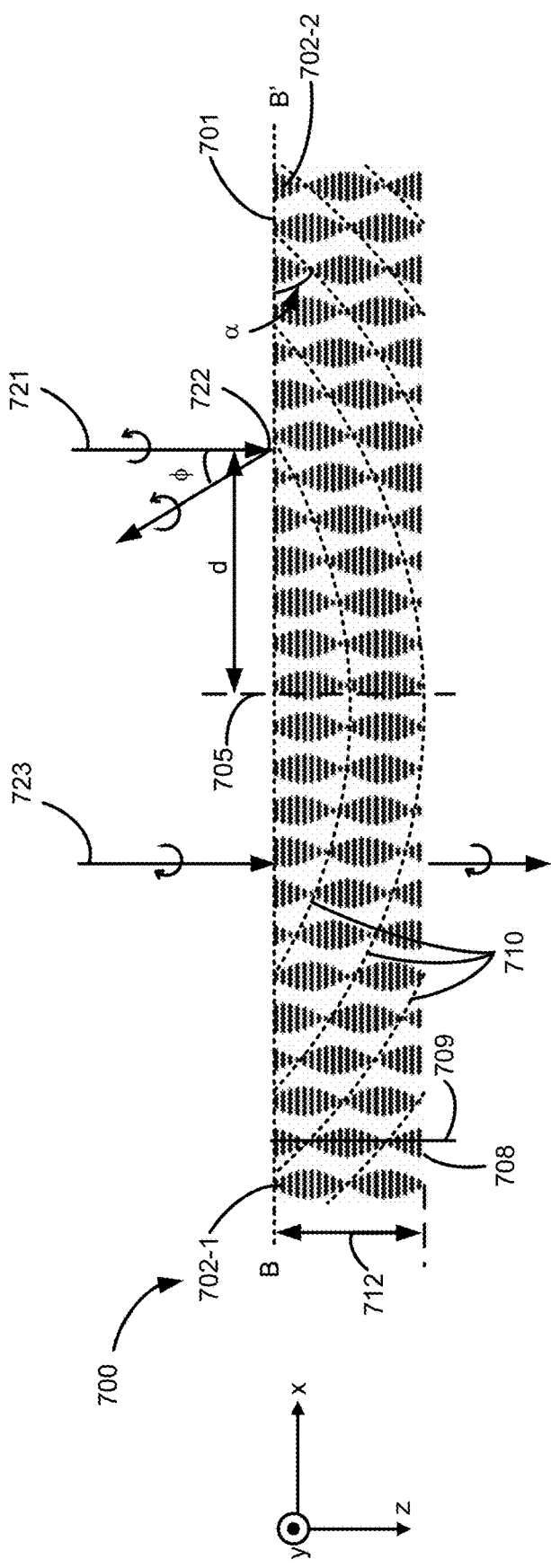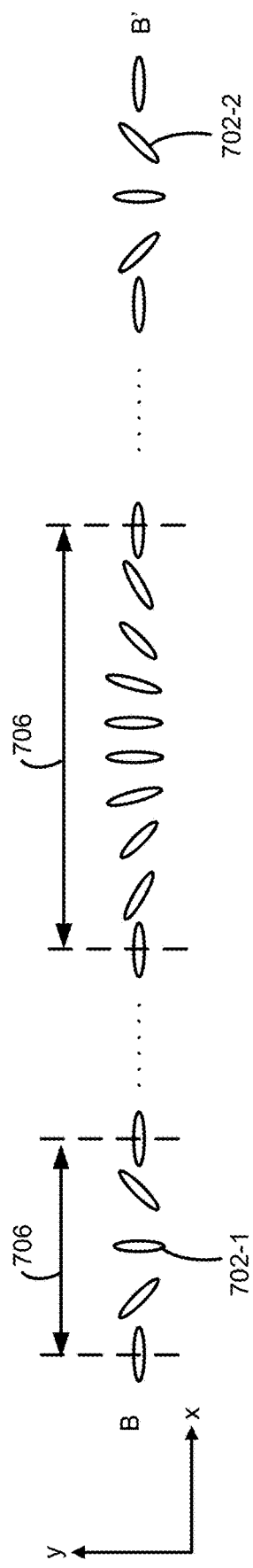
Figure 7A
Figure 7B

OPTICAL ASSEMBLY WITH POLARIZATION VOLUME HOLOGRAPHIC ELEMENT

RELATED APPLICATION

This application claims priority and benefit to U.S. Provisional Application No. 62/673,807, filed May 18, 2018, entitled "Pancake Lens Based on Reflective Polarization Volume Holograms," which is hereby incorporated by reference in its entirety.

TECHNICAL FIELD

This relates generally to an optical assembly, and more specifically to an optical assembly with a polarization volume holographic element.

BACKGROUND

Head-mounted display devices (also called herein head-mounted displays) are gaining popularity as means for providing visual information to a user. However, the size and weight of conventional head-mounted displays have limited applications of head-mounted displays.

Head-mounted display devices with wide field of view are desired for improved user experience but are challenging to obtain because the compact sizes of head-mounted display devices limit the effective focal length for projecting images from a display to the eyes of a user.

SUMMARY

Accordingly, there is a need for head-mounted display devices capable of rendering images with an increased field of view to enhance users' overall experience of virtual reality and/or augmented reality. In addition, the head-mounted display devices should be light-weight and compact.

The above deficiencies and other problems associated with conventional head-mounted displays are reduced or eliminated by the disclosed optical assembly for use in display devices, including optical assemblies with folded optics.

In accordance with some embodiments, the optical assembly includes a partial reflector and a first polarization volume holographic element optically coupled with the partial reflector. The partial reflector is capable of receiving first light having a first circular polarization and transmitting a first portion of the first light having the first circular polarization. The first polarization volume holographic element is configured to receive the first portion of the first light having the first circular polarization and reflect the first portion of the first light having the first circular polarization as second light having the first circular polarization. The partial reflector is capable of receiving the second light having the first circular polarization and reflecting a first portion of the second light having the first circular polarization as third light having a second circular polarization that is distinct from the first circular polarization. In some embodiments, the second circular polarization is orthogonal to the first circular polarization. The first polarization volume holographic element is configured to receive the third light having the second circular polarization and transmit the third light having the second circular polarization.

In accordance with some embodiments, a method includes receiving, with a partial reflector, first light having a first circular polarization and transmitting, through the partial reflector, a first portion of the first light having the first circular polarization. The method further includes receiving, with a first polarization volume holographic element optically coupled with the partial reflector, the first portion of the light having the first circular polarization and reflecting the first portion of the light having the first circular polarization as second light having the first circular polarization. The method further includes receiving, with the partial reflector, the second light having the first polarization and reflecting, with the partial reflector, a first portion of the second light having the first polarization as third light having a second circular polarization that is distinct from the first circular polarization. The method further includes receiving, with the first polarization volume holographic element, and transmitting, through the first polarization volume holographic element, the third light having the second circular polarization.

Thus, the optical assemblies in the disclosed embodiments and display devices including such optical assemblies provide increased field of views. In some embodiments, the display devices are head-mounted display devices. In some embodiments, the optical assemblies include one or more flat polarization volume holograms focusing mirrors and provide reduced size and weight, as compared with conventional optical assemblies for head-mounted displays.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIGS. 7A-7C are schematic diagrams illustrating a polarization volume hologram in accordance with some embodiments.

Figure 1:
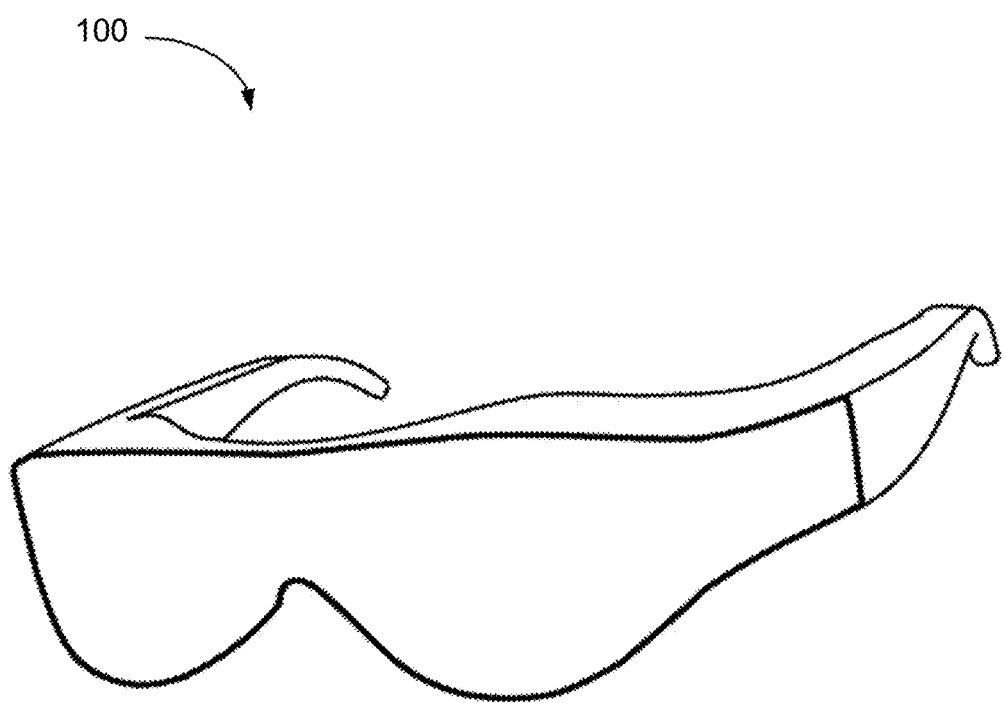
FIG. 1 is a perspective view of a display device in accordance with some embodiments.

These figures are not drawn to scale unless indicated otherwise.

DETAILED DESCRIPTION

The present disclosure provides optical assemblies including folded optical systems (e.g., pancake lenses) configured to increase the length of an optical path of light projected from a display toward an eye of a user. The optical assemblies include one or more polarization volume holograms (PVH) configured to reflect or transmit light based on polarization of the light. Such folded optical systems are configured to increase field of view without increasing the physical distance between the display and the eye of the user or compromising image quality. The optical assemblies including one or more PVH have dimensions similar or smaller than those of traditional optical assemblies with corresponding optical properties, but are lighter in weight.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first PVH could be termed a second PVH, and, similarly, a second PVH could be termed a first PVH, without departing from the scope of the various described embodiments. The first reflector and the second PVH are both light reflector, but they are not the same PVH.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1, or to be included as part of a helmet that is to be worn by the user). When display device 100 is configured to be worn on a head of a user, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
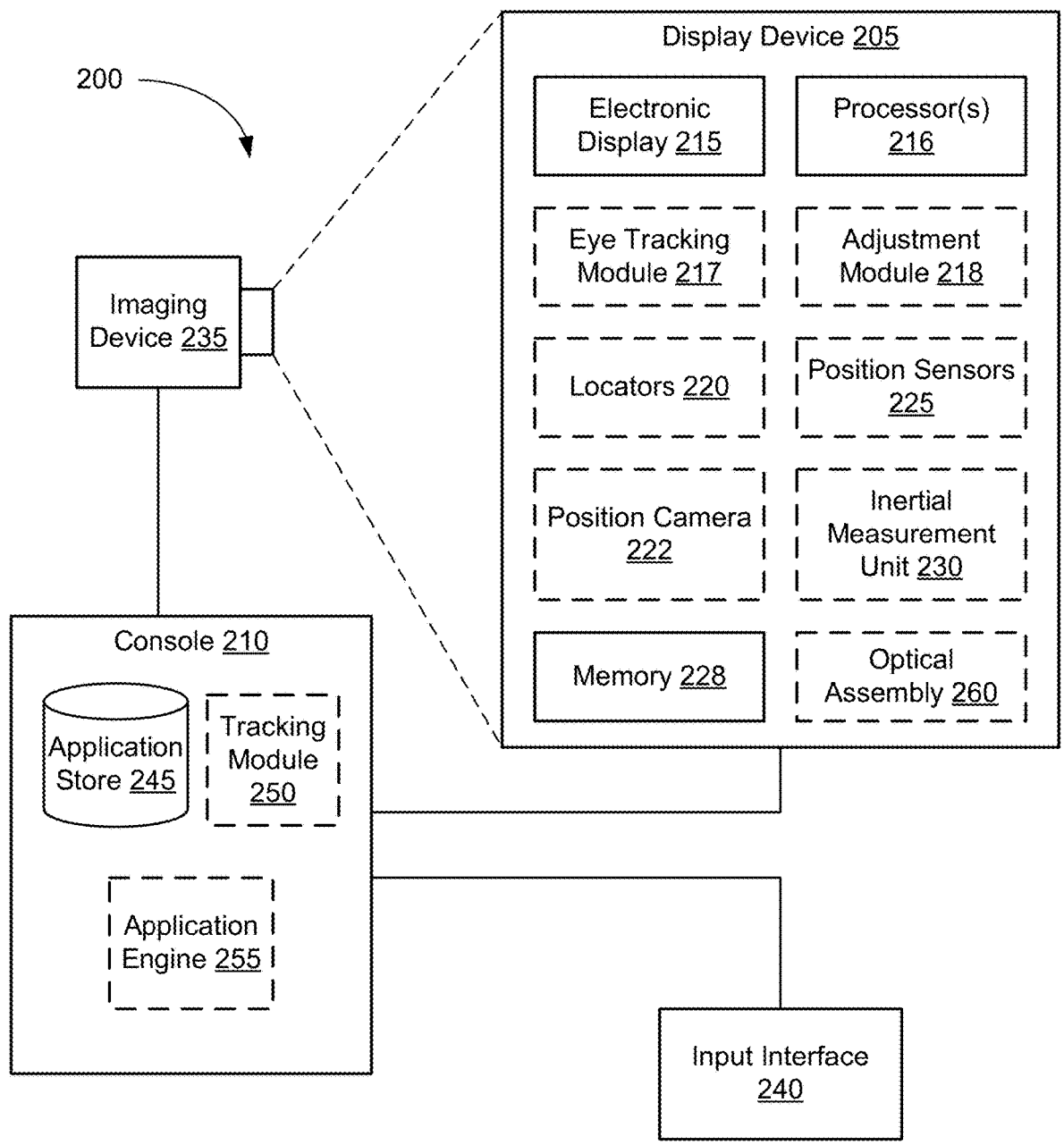
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 corresponds to display device 100 and is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more optical assemblies 260, or a subset or superset thereof (e.g., display device 205 with electronic display 215, optical assembly 260, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to project images to the user through one or more optical assemblies 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more optical components in the one or more optical assemblies 260 direct light from the arrays of light emission devices (optionally through the emission intensity arrays) to locations within each eyebox and ultimately to the back of the user's retina(s). An eyebox is a region that is occupied by an eye of a user of display device 205 (e.g., a user wearing display device 205) who is viewing images from display device 205. In some cases, the eyebox is represented as a 10 mm×10 mm square. In some embodiments, the one or more optical components include one or more coatings, such as anti-reflective coatings, and one or more polarization volume holograms (PVH).

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile sub-images together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light toward the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 includes one or more optical assemblies 260. In some embodiments, display device 205 optionally includes a single optical assembly 260 or multiple optical assemblies 260 (e.g., an optical assembly 260 for each eye of a user). In some embodiments, the one or more optical assemblies 260 receive image light for the computer generated images from the electronic display device(s) 215 and direct the image light toward an eye or eyes of a user. The computer-generated images include still images, animated images, and/or a combination thereof. The computer-generated images include objects that appear to be two-dimensional and/or three-dimensional objects.

In some embodiments, electronic display device 215 projects computer-generated images to one or more reflective elements (not shown), and the one or more optical assemblies receive the image light from the one or more reflective elements and direct the image light to the eye(s) of the user. In some embodiments, the one or more reflective elements are partially transparent (e.g., the one or more reflective elements have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of part or all of display device 300, which corresponds to part or all of display device 100 in FIG. 1 in accordance with some embodiments. In some other embodiments, display device 300 is part of some other electronic display (e.g., a digital microscope, a head-mounted display device, etc.). In some embodiments, display device 300 includes an emission surface 310 (e.g., a light emission device array or reflective element), and an optical assembly having one or more optical components 330, 335 (e.g., lenses). In some embodiments, display device 300 also includes an IR detector array. Although two optical components 330, 335 in the optical assembly are shown in FIG. 3, the optical assembly can include more or less optical components.

In some embodiments, light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

In some embodiments, display device 300 includes an emission intensity array configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to control what portion of the image light emitted from light emission device array 310 is passed to the one or more optical components 330, 335. In some embodiments, display device 300 uses an emission intensity array to facilitate providing image light to a location of pupil 345 of eye 340 of a user, and minimize the amount of image light provided to other areas in the eyebox.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and an emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 345, the display element adjusts the emitted image light such that the light output by the display element is refracted by one or more optical components 330, 335 toward the determined location of pupil 345, and not toward another presumed location.

In some embodiments, display device 300 includes one or more broadband sources (e.g., one or more white LEDs) coupled with a plurality of color filters, in addition to, or instead of, light emission device array 310.

One or more optical components 330, 335 receive the image light (or modified image light, e.g., attenuated light) from the emission surface 310, and direct the image light to a detected or presumed location of pupil 345. In some embodiments, the one or more optical components include one or more polarization volume holograms (PVH) and a partial reflector.

Figure 4A:
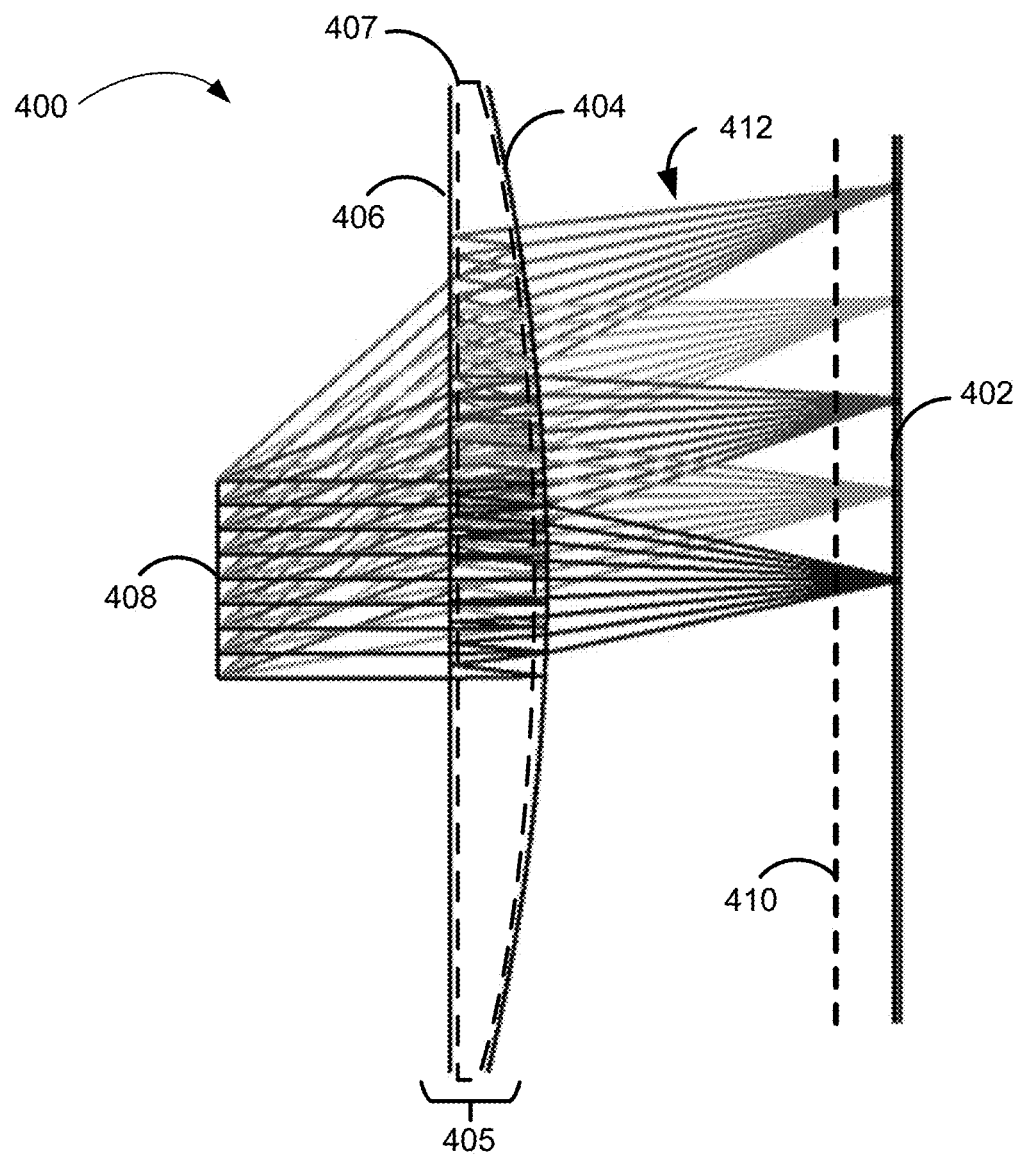
FIG. 4A is a schematic diagram illustrating a display device including an optical assembly in accordance with some embodiments.

FIG. 4A is a schematic diagram illustrating display device 400 including optical assembly 405 in accordance with some embodiments. In some embodiments, display device 400 corresponds to part or all of display device 100 configured to be worn on a head of a user described above with respect to FIG. 1. In some embodiments, display device 400 is configured to render virtual and/or augmented reality images to a user. Display device 400 includes an emission surface (or display) 402 optically coupled with optical assembly 405. In some embodiments, display 402 corresponds to emission surface 310 described above with respect to FIG. 3. In some embodiments, display 402 is a liquid crystal display (LCD). Display device 402 projects light 412 (e.g., image light) toward optical assembly 405. In some embodiments, display device 400 includes polarization plate 410 located between, and optically coupled with, display 402 and optical assembly 405. Polarization plate 410 is configured to change polarization of light 412 projected by display 402 so that light received by optical assembly 405 has a circular polarization (e.g., polarization plate 410 is a quarter-wave plate changing linearly polarized light projected by display 402 to a circularly polarized light). In some embodiments, polarization plate 410 is coupled with, or included in, display 402. In some embodiments, polarization plate 410 is coupled with partial reflector 404 of optical assembly 405.

In some embodiments, reference plane 408 corresponds an eyebox of a user wearing display device 400. Optical assembly 405 includes polarization volume hologram (PVH) 406 and partial reflector 404 optically coupled with PVH 406. Optical assembly 405 is a folded lens system configured to increase the length of an optical path from display 402 to reference plane 408. Such folded lens system is configured to increase field of view without increasing the physical distance between display 402 and reference plane 408 (e.g., eye of a user).

PVH 406 is an anisotropic optical element made of polarization-sensitive material using method of holography. In some embodiments, PVH 406 includes liquid crystals (e.g., liquid crystals formed of cholesteric liquid crystals) and/or photopolymers arranged in helical configurations. PVH 406 is configured to selectively interact with incident light based on polarization, wavelength and/or incident angle of the light. In particular, PVH 406 is configured to be selective with respect to circular polarization of light. When handedness of circularly polarized light (e.g., light 412) impinging on PVH 406 corresponds to the handedness of the helical twist of the helical configurations, PVH 406 interacts with the light and thereby changes the direction of the light. In FIG. 4A, PVH 406 functions as a reflective lens configured to change direction of light with a first circular polarization and to transmit light with a second circular polarization without changing its direction or polarization. For example, the first circular polarization is right-handed circularly polarized (RCP) light and the second circularly polarized light is left-handed circularly polarized (LCP) light, or vice versa. In contrast to a conventional reflector, PVH 406 does not change polarization of a circularly polarized light as the light is reflected. For example, PVH 406 reflects RCP light and transmits LCP light without changing their respective polarizations. An example of PVH 406 is described in further detail below with respect to FIGS. 7A-7D.

In some embodiments, partial reflector 404 is a 50:50 mirror configured to transmit a first portion of light impinged thereon and reflect a second portion of the light impinged thereon (e.g., partial reflector 404 reflects 50% of light impinged thereon and transmits 50% of light impinged thereon). Partial reflector 404 is not a polarization directed optical component, but instead, is configured to reflect a first portion of any light it receives and transmit a second portion of the light. In the example illustrated in FIG. 4A, partial reflector 404 has a concave shape and is therefore further configured to converge light 412 toward reference plane 408. In some embodiments, partial reflector 404 has some other curved shape (e.g., elliptical, spherical, or aspherical shape). In some embodiments, partial reflector is flat and thus does not assert optical power on light 412. In some embodiments, partial reflector 404 includes a partially reflective coating on a flat or curved surface of a substrate (e.g., on a glass or plastic substrate). In some embodiments, PVH 406 is also flat and is configured to function as a focusing mirror for light of certain polarization, with a wavelength in a certain spectral range, and/or having an incident angle within a certain range of incident angles.

As shown in FIG. 4A, partial reflector 404 is separated from PVH 406. In some embodiments, at least a center portion of partial reflector 404 is separated from PVH 406. In some embodiments, optical assembly 405 further includes substrate 407, which is an optically transparent substrate in contact with PVH 406 and partial reflector 404. In FIG. 4A, substrate 407 has a curved surface in contact with partial reflector 404 and a flat surface in contact with PVH 406. In some embodiments, substrate 407 is a lens (e.g., substrate 407 is a plano-convex lens, a convex-convex lens or a flat lens). In certain embodiment, the PVH 406 is a layer of liquid crystal coated on the flat side of the substrate 407.

As shown in FIG. 4A, light 412 projected by display 402 is received by partial reflector 404, partially transmitted through the partial reflector 404 toward PVH 406, reflected by the PVH 406 back toward partial reflector 404, partially reflected by the partial reflector 404, and then transmitted through PVH 406 onto reference plane 408. The polarization of light 412 passing through optical assembly 405 is described in detail below with respect to FIG. 4B.

Figure 4B:
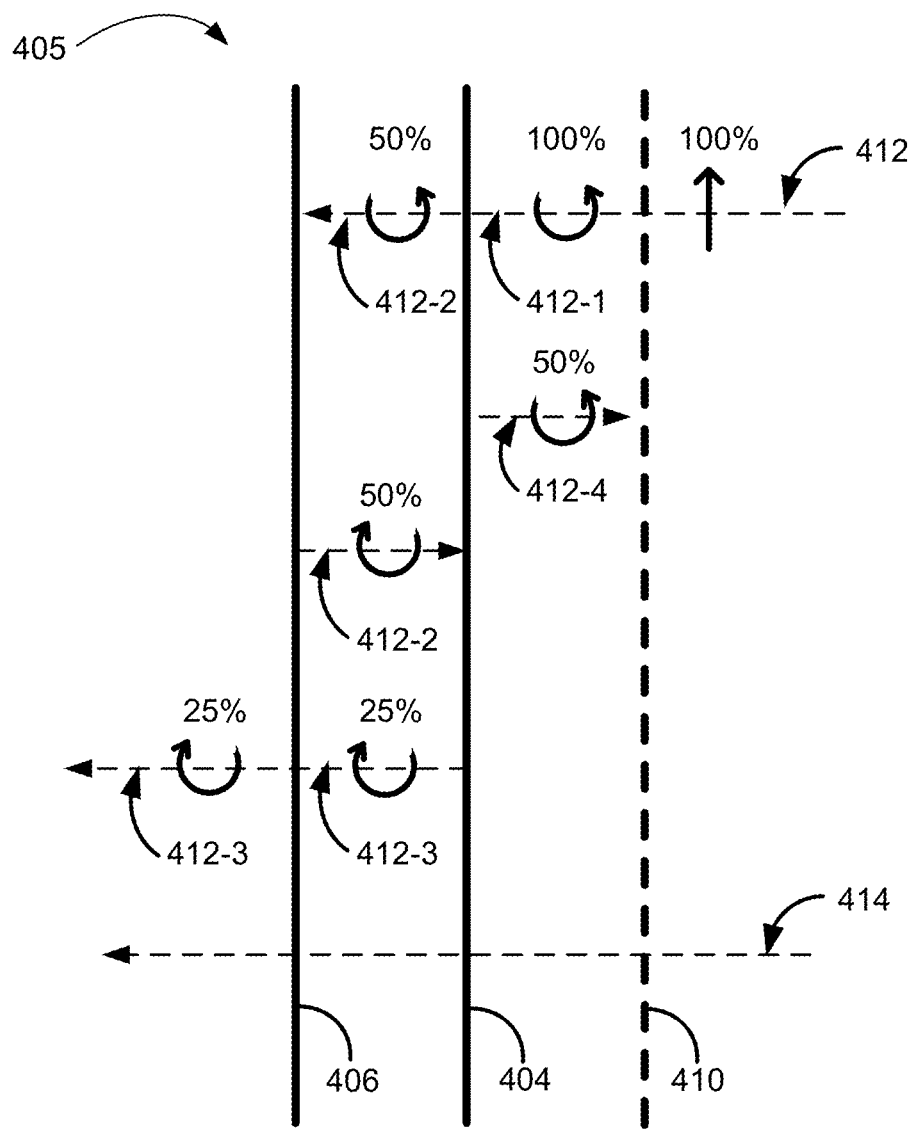
FIG. 4B is a schematic diagram illustrating optical path of light transmitted through the optical assembly of FIG. 4A in accordance with some embodiments.

FIG. 4B is a schematic diagram illustrating optical path of light 412 transmitted through optical assembly 405 in accordance with some embodiments. It is noted that directions of polarizations are indicated with respect to direction of a respective light in FIG. 4B. In the instance that light 412 projected by display 402 is linearly polarized (e.g., display 402 is a LCD projecting linearly polarized light), polarization plate 410 converts the polarization of light 412 from a linear polarization to a first circular polarization and transmits the converted light 412 as light 412-1. Light 412-1 having the first circular polarization is then received by partial reflector 404, which transmits a first portion (e.g., 50%) of light 412-1 as light 412-2 toward PVH 406 and reflects a second portion (e.g., 50%) of light 412-1 as light 412-4. PVH 406 receives the portion of light 412-2 having the first circular polarization and reflects light as light 412-2 toward partial reflector 404 without changing its polarization. Light 412-2 having the first polarization is then reflected by partial reflector 404 as light 412-3 toward PVH 406 and concurrently the polarization of light 412-3 is changed from the first circular polarization to a second circular polarization distinct from the first circular polarization. For example, the first circular polarization is RCP and the second circular polarization is LCP, or vice versa. Light 412-3 having the second circular polarization is then transmitted through PVH 406. In some embodiments, the overall efficiency of optical assembly 405 is 25% or less as light 412 interacts twice with partial reflector 404 (e.g., a 50:50 mirror). In some embodiments, partial reflector 404 reflects a second portion (e.g., 50%) of light 412-1 as light 412-5, as shown in FIG. 4B.

As explained above, optical assembly 405 is configured to converge or diverge light 412 having the first circular polarization when received by PVH 406 due to polarization selectivity of PVH 406 (e.g., in FIG. 4A light 412 is converged onto reference plane 408). However, due to the polarization selectivity, optical assembly 405 is configured to transmit light (e.g., light 414) having the second circular polarization when received by PVH 406 without converging or diverging light 414. In some embodiments, PVH 406 is also wavelength selective. In such embodiments, optical assembly is configured to converge or diverge light 412 having the first circular polarization and a first wavelength in a first spectral range while transmitting light 414 having a second wavelength in a second spectral range distinct from the first spectral range without converging or diverging light 414.

Figure 5A:
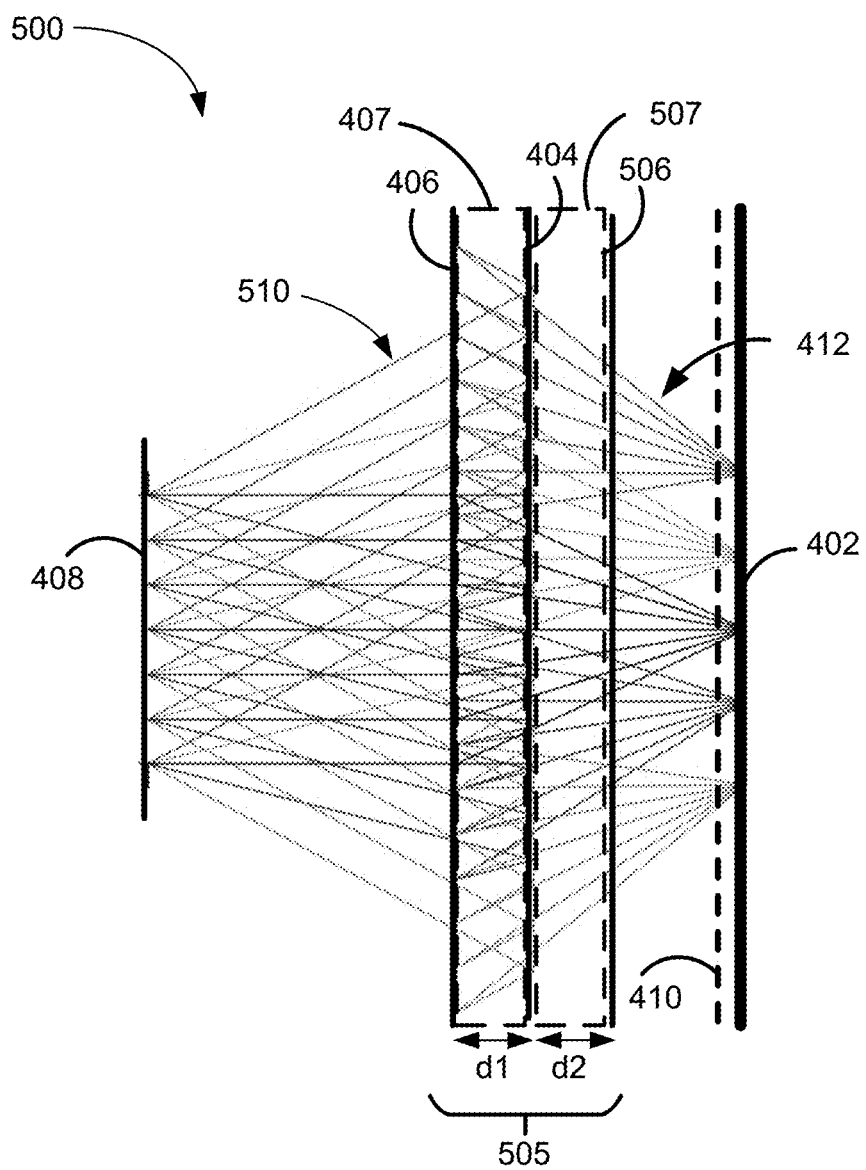
FIGS. 5A-5B are schematic diagrams illustrating a display device including optical assembly in accordance with some embodiments.
Figure 5B:
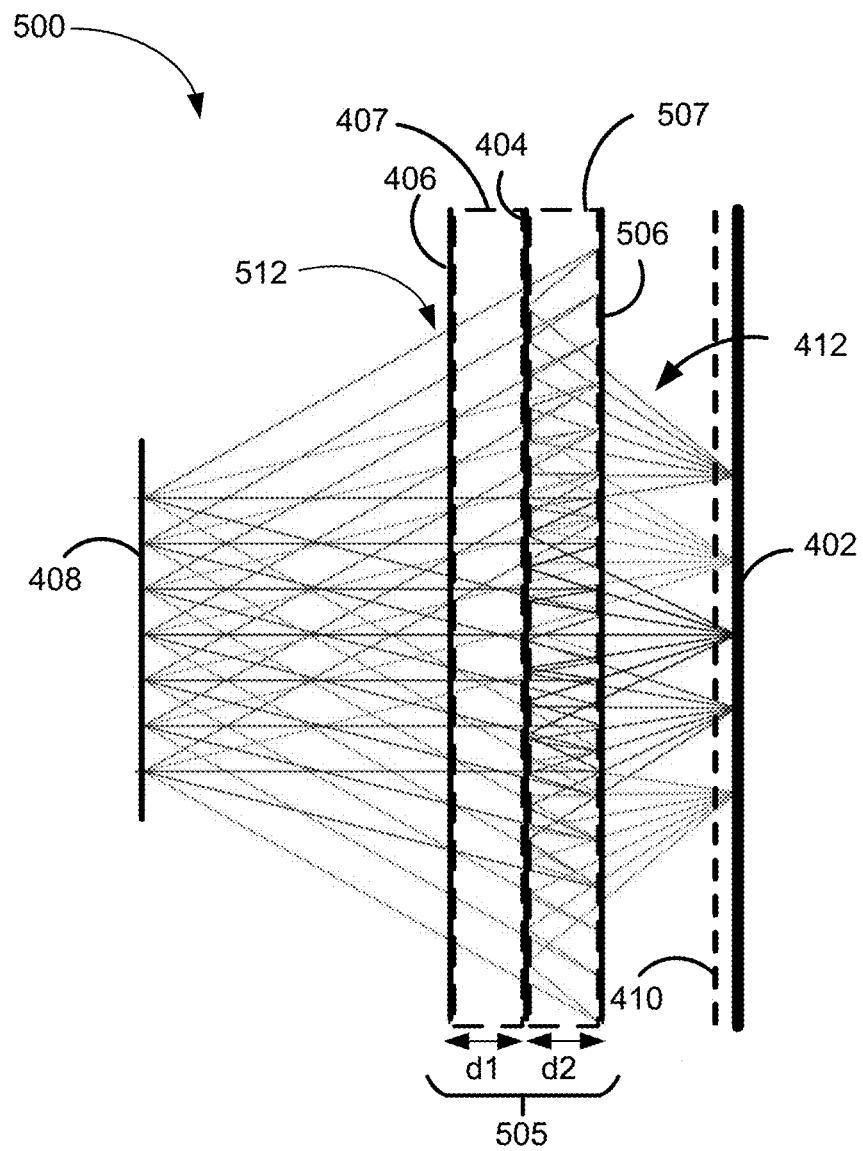

FIGS. 5A-5B are schematic diagrams illustrating display device 500 including optical assembly 505 in accordance with some embodiments. Display device 500 corresponds to display device 100 described above with respect to FIG. 1. Compared with display device 400, display device 500 further includes PVH 506. In some embodiments, PVH 406 and PVH 506 are configured to reflect and focus light of opposite circular polarizations. For example, PVH 406 is configured to reflect and focus light having a first circular polarization while transmitting light having a second polarization opposite to the first circular polarization, and PVH 506 is configured to reflect and focus light having the second circular polarization while transmitting light having the first polarization. PVH 506 is positioned between display 402 and partial reflector 404. In some embodiments, PVH 506 is configured to reflect and focus light 412-5, which is the second portion of light 412-1 reflected by partial reflector 404. Light 412-5 thus has circular polarization opposite to the polarization of light 412-2, which is the first portion of light 412-1 transmitted by partial reflector 404 and then reflected and focused by PVH 406.

Compared to optical assembly 405, optical assembly 505 provides two different optical paths to direct light 412 projected by display 402 onto reference plane 408, thereby increasing the overall efficiency of directing light projected by display 402 onto reference plane 408 compared to optical assembly 405. The two different optical paths are referred to as optical paths 510 and 512 in FIGS. 5A and 5B, respectively.

In FIG. 5A, light 412 projected by display 402 passes through PVH 506 and is received by, and partially transmitted by, partial reflector 404 toward PVH 406. It is then reflected and focused by PVH 406 back toward partial reflector 404, and thereafter partially reflected by the partial reflector 404. The portion of light 412 reflected by the partial reflector 404 is then transmitted through PVH 406 onto reference plane 408.

In FIG. 5B, light 412 projected by display 402 passes through PVH 506 and is partially reflected by partial reflector 404 back toward PVH 506. It is then reflected and focused by PVH 506 toward partial reflector 404, and a portion of the light 412 is thereafter transmitted through PVH 406 onto reference plane 408. The polarization of light 412 in the two different optical paths 510, 512 through optical assembly 505 are described in detail below with respect to FIG. 5C.

As shown in FIGS. 5A and 5B, partial reflector 404 is separated from PVH 406 on one side by a first distance d1 and from PVH 506 on the other side by a second distance d2. In some embodiments, optical assembly 505 further includes substrates 407 and 507. Substrate 407 is an optically transparent substrate in contact with PVH 406 and partial reflector 404. Substrate 507 is an optically transparent substrate in contact with PVH 506 and partial reflector 404. In FIGS. 5A and 5B, substrate 407 has a flat surface in contact with partial reflector 404 and a flat surface in contact with PVH 406; and substrate 507 has a flat surface in contact with partial reflector 404 and a flat surface in contact with PVH 506. In some embodiments, PVH 406 is a layer of liquid crystal coated on the substrate 407, and PVH 506 is a layer of liquid crystal coated on the substrate 507.

In some embodiments, PVH 406 and PVH 506 both focus light onto reference plane 408 (e.g., to a focal point located on reference plane 408). PVH 406 has a first reflective focal length and PVH 506 may have a second reflective focal length. In some embodiments, partial reflect 404 is flat, and the PVH 406 and PVH 506 are disposed on opposite sides of partial reflector 404 with equal distances from partial reflector 404. In some embodiments, the first reflective focal length and the second reflective focal length are equal to each other to ensure optical paths 510 and 512 have equal length.

Figure 5C:
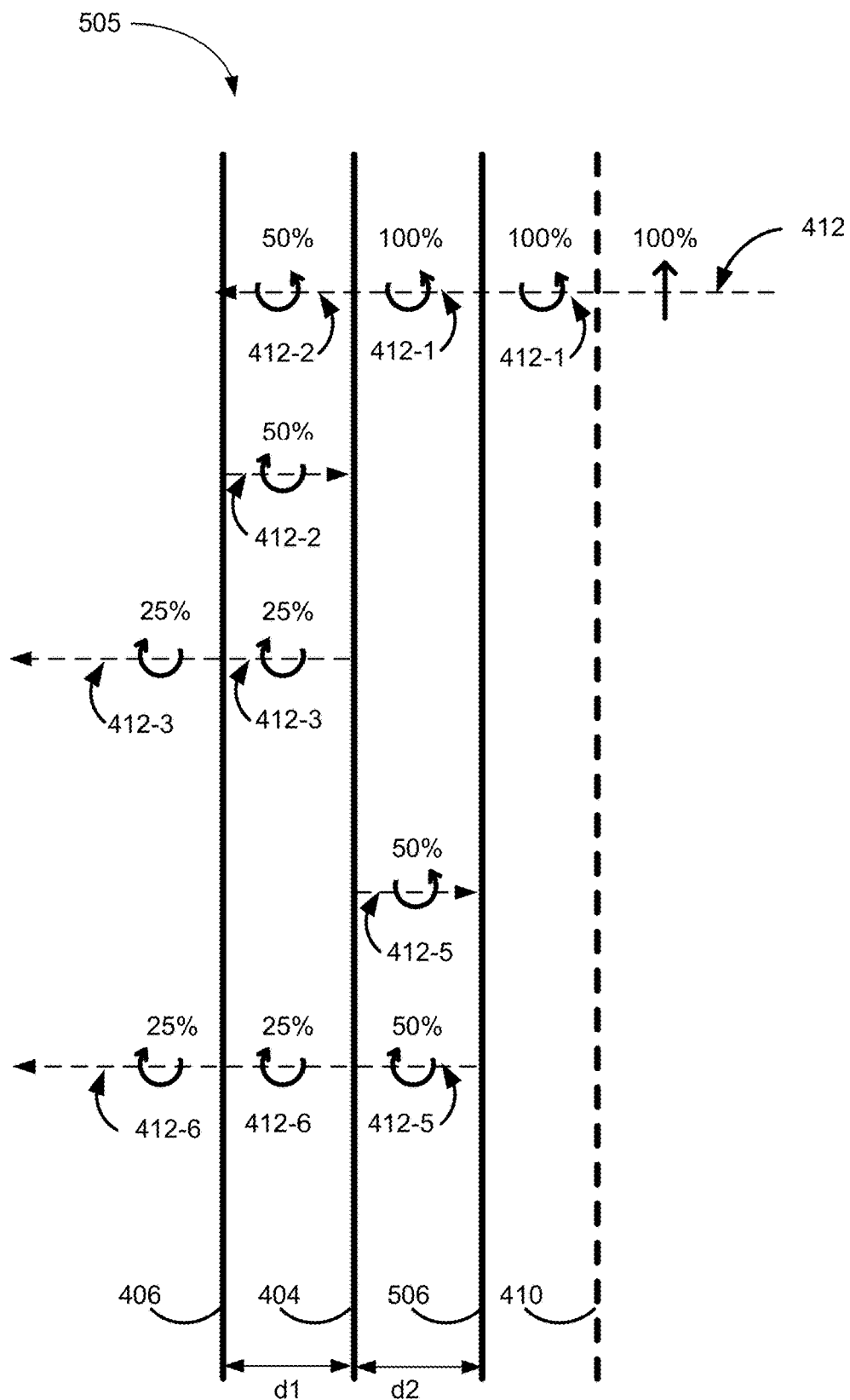
FIG. 5C is a schematic diagram illustrating optical paths of light transmitted through the optical assembly of FIGS. 5A-5B in accordance with some embodiments.

FIG. 5C is a schematic diagram illustrating optical paths of light 412 transmitted through optical assembly 505 in accordance with some embodiments. It is noted that directions of polarizations are indicated with respect to direction of a respective light in FIG. 5C. In some embodiments, light 412 projected by display 402 is linearly polarized (e.g., display 402 is a LCD projecting linearly polarized light). Light 412 is transmitted through polarization plate 410 that converts light 412 to light 412-1 having a first circular polarization. Light 412-1 having the first circular polarization is transmitted through PVH 506 and is received by partial reflector 404, which transmits a portion of light 412-1 (e.g., 50%) as light 412-2 toward PVH 406 and reflects another portion of light 412-1 (e.g., 50%) as light 412-5 back toward PVH 506. PVH 406 receives light 412-2 having the first circular polarization and reflects the light toward partial reflector 404 without changing its polarization. A portion of light 412-2 (e.g., 50%) having the first polarization is then reflected by partial reflector 404 toward PVH 406 as light 412-3 having a second circular polarization opposite to the first circular polarization. Afterwards, light 412-3 having the second circular polarization is transmitted through PVH 406. An optical path of light 412 when transmitted through optical assembly 505 is at least three times distance d1 between partial reflector 404 and PVH 406.

Due to the reflection by partial reflector 404, light 412-5 has the second circular polarization. Thus, when PVH 506 receives light 412-5 having the second circular polarization, it reflects the light toward partial reflector 404 without changing its polarization. A portion of light 412-5 (e.g., 50%) having the second polarization is then transmitted through partial reflector 404 as light 412-6 toward PVH 406. Afterwards, light 412-6 having the second circular polarization is transmitted through PVH 406. The overall efficiency of optical assembly 505 is a sum of light 412-3 and light 412-6 transmitted by optical assembly, and is therefore higher than the efficiency of optical assembly 405. In some embodiments, the overall efficiency of optical assembly 505 is about 50%, as light 412-3 and 412-6 are both transmitted through optical assembly 505 with 25% efficiency.

Figure 6A:
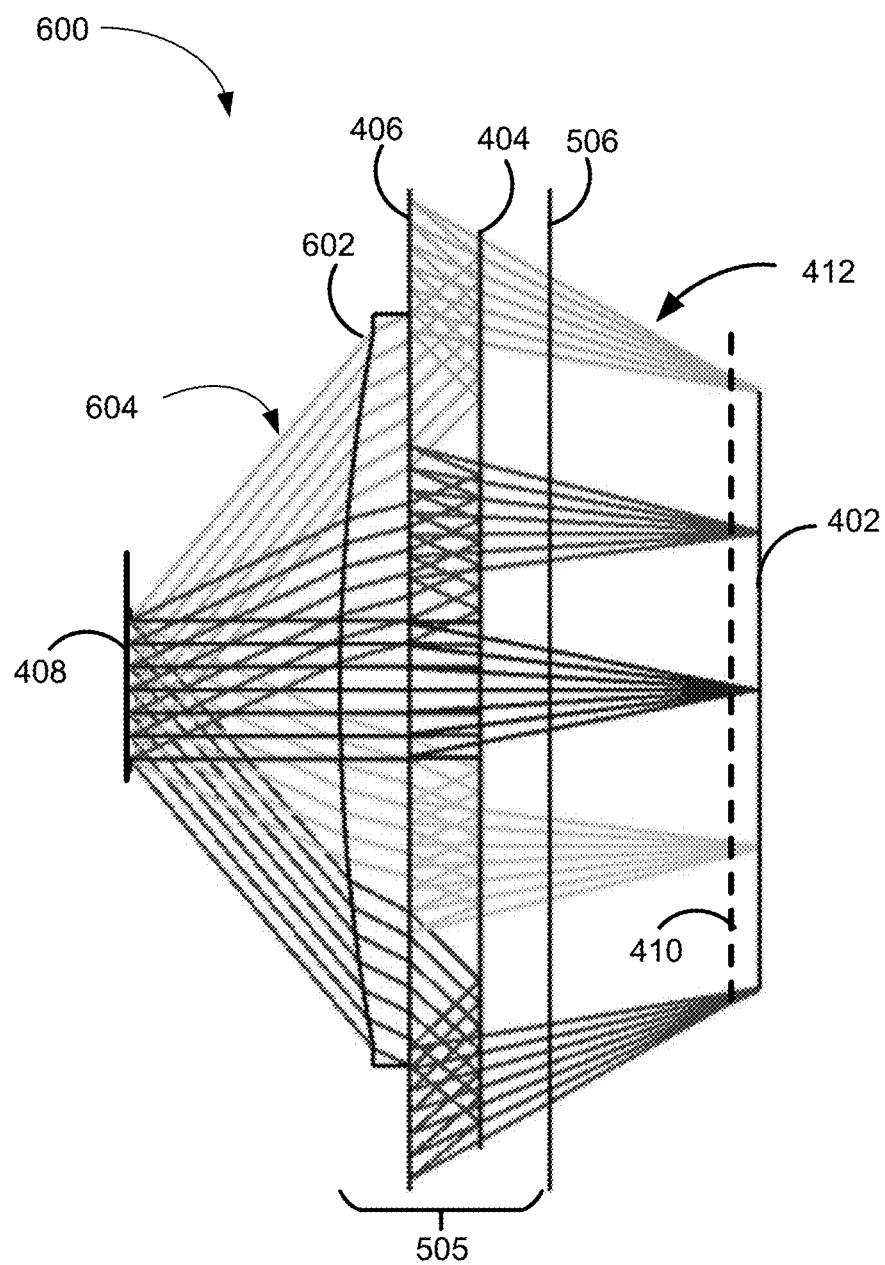
FIGS. 6A-6B are schematic diagrams illustrating a display device in accordance with some embodiments.
Figure 6B:
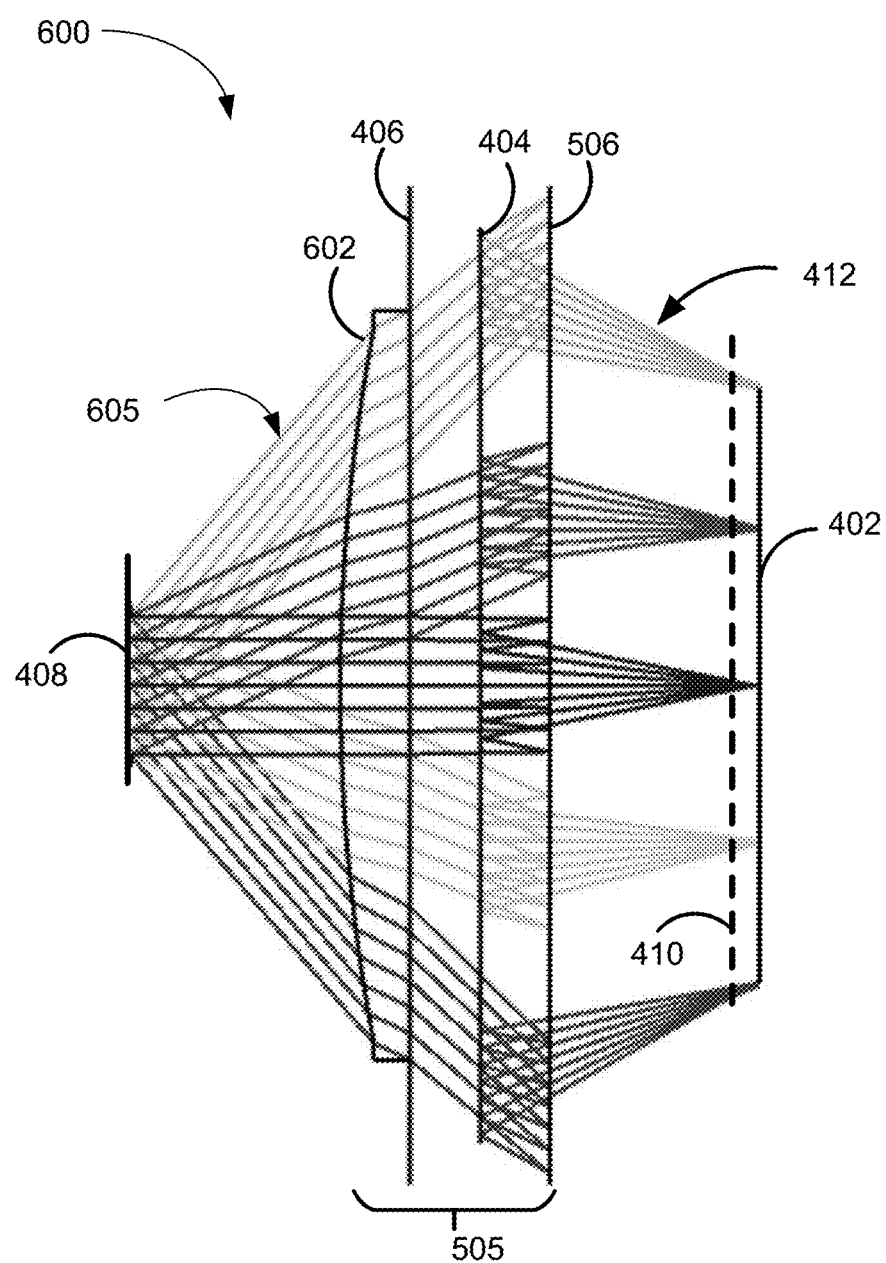

FIGS. 6A-6B are schematic diagrams illustrating display device 600 in accordance with some embodiments. Display device 600 corresponds to display device 500 described with respect to FIGS. 5A-5B, except that in FIGS. 6A-6B, optical assembly 505 further includes lens 602 optically coupled to PVH 406. Lens 602 is configured to further focus light 412 onto reference plane 408. FIG. 6A shows optical path 604 of light 412 and FIG. 6B shows optical path 605 of light 412. In FIGS. 6A and 6B, lens 602 is a plano-convex lens having a flat surface coupled to, or adjacent to, PVH 406 while a convex surface is facing reference plane 408. In some embodiments, lens 602 is separated from PVH 406. In some embodiments lens 602 is a flat lens, a convex-convex lens, a convex-concave lens, a spherical lens, an aspherical lens, or other lens suitable for focusing light 412 onto reference plane 408. In some embodiments, lens 602 can have a curved surface facing PVH 406, and PVH 406 can be coupled to the curved surface and thus has a curved shape.

FIGS. 7A-7B are schematic diagrams illustrating a polarization volume hologram (PVH) optical element 700 in accordance with some embodiments. In some embodiments, PVH optical element 700 (referred to hereafter as "PVH") corresponds to PVH optical elements of display devices described above with respect to FIGS. 4A-6B (e.g., optical elements 406, 506). PVH 700 has a surface 701 parallel to an x-y plane and includes a layer of liquid crystals 702-1, 702-2 (e.g., cholesteric liquid crystals) arranged in helical structures 708 along respective helical axis 709 in the z-direction and having a helical period length 712. As shown in FIGS. 7A and 7B, in addition to rotating along the helical axis, helical rotation angles of liquid crystals 702-1, 702-2 also vary in the x-y plane, resulting in liquid crystals of a same helical rotation angle forming a series of concave curves 710 under the surface 701, and giving the PVH 700 the properties of not only deflecting or refracting light of a certain circular polarization and in a certain spectral range, but also exerting optical power on such light. In other words, PVH 700 functions as a focusing mirror to light of a certain circular polarization and in a certain spectral range. In some embodiments, the concave curves 710 are symmetrical with respect to an optical axis (or geometrical center) 705 of the PVH optical element 700.

As shown in FIG. 7A, due at least in part to the helical structures 708 in the PVH, light 721 incident on the reflective surface 701 in the normal direction and having polarization corresponding to the helical twists of the helical structures and wavelength in a particular spectral range is deflected off the surface 701 at a deflection angle φ without change in polarization. In some embodiments, this angle φ increases with the distance d between a location of incidence 722 and the optical axis (or geometrical center) 705 due to the increasing slant angle α of the concave curves near the surface 701, resulting in a focusing effect on light 721 as it is deflected. On the other hand, incident light 723 with a different polarization from that of light 722 and/or outside the particular spectral range is transmitted through the PVH without change in direction or polarization.

Figure 7C:
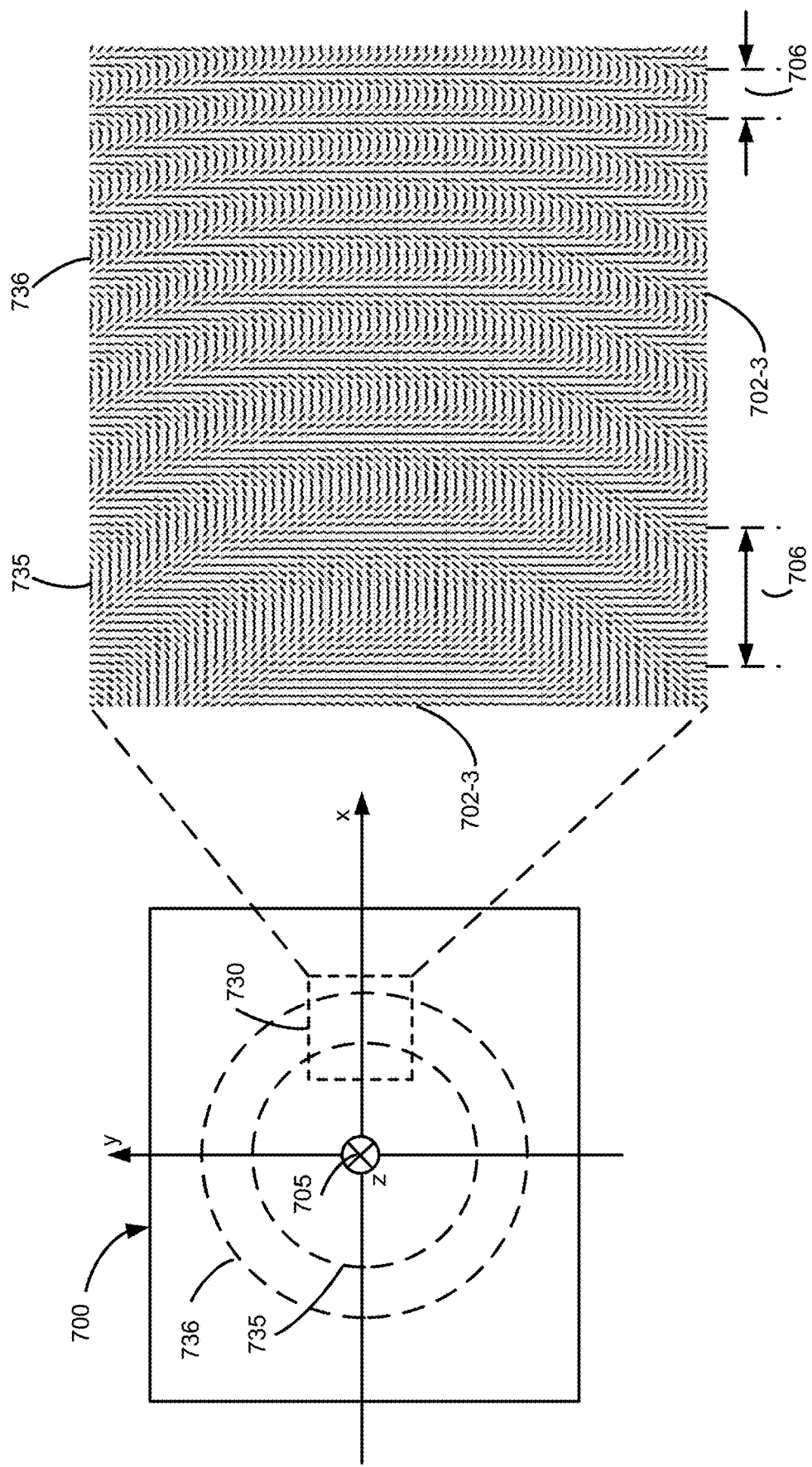

FIG. 7B illustrates rotational variations of liquid crystals along line B-B' in FIG. 7A, according to some embodiments. FIG. 7C is a top down view of PVH 700 along the z direction, in which rotational variations of liquid crystals 702-3 in a square portion of the PVH are shown to exhibit patterns of concentric fringes 735, 736 across the x-y plane. As shown in FIG. 7C, each of the fringes 735, 736 are formed by liquid crystals in a same-x-y place and having a same direction of rotation. FIGS. 7B and 7C also show period length 706 of rotation variation along x-direction (or radial direction) decreasing with distance from optical axis (or geometrical center) 705 of PVH 700.

Thus, PVH 700 may exert or not exert optical power on an incident light based at least in part on a polarization of the incident light. In some embodiments, PVH optical element is selective with respect to circular polarization of light. For example, when the state (handedness) of the circularly polarized light corresponds to the helical twist of the liquid crystals, the PVH optical element interacts with the circularly polarized light and thereby changes the direction of the light (e.g., by reflecting the light). In some embodiments, the PVH 700 is a thin and flat PVH and thus can be included in the optical assembly 400, 500 without significant increase in the width or weight of the optical assembly. In some embodiments, PVH 700 has a thickness ranging from 200 nm to 20 μm.

Various methods can be employed to make PVH 700, such as using direct laser writing or photopolymers to record interference patterns of left- and right-handed circular-polarized beams. Helical structures of the liquid crystals along the z-direction can also be achieved by doping a chiral dopant into a birefringent host, and the periodicity (or pitch length) 712 can be adjusted by controlling a helical twist power and concentration of a chiral dopant. Since Bragg reflection (which can be the main mechanism contributing to the focusing mirror function of PVH 700) requires several periods to build up, the birefringent material needs to be thick enough to allow several pitches to co-exist in the bulk.

In light of these principles, we now turn to certain embodiments of optical assemblies.

In accordance with some embodiments, the optical assembly includes a partial reflector and a first polarization volume holographic element optically coupled with the partial reflector (e.g., optical assembly 405 includes partial reflector 404 and PVH 406 in FIG. 4A). The partial reflector is capable of receiving first light having a first circular polarization (e.g., partial reflector 404 receives light 412-1 having the first circular polarization in FIG. 4B) and transmitting a first portion of the first light (e.g., 50% of light 412-1) having the first circular polarization (in some cases, without converting the first circular polarization). The first polarization volume holographic element is configured to receive the first portion of the first light having the first circular polarization and reflect the first portion of the first light having the first circular polarization (in some cases, without converting the first circular polarization) as second light having the first circular polarization (e.g., PVH 406 receives light 412-1 and reflects it as light 412-2 without changing its polarization). The partial reflector is capable of receiving the second light having the first circular polarization and reflecting a first portion of the second light (e.g., 50% of light 412-2) having the first circular polarization as third light having a second circular polarization (e.g., as light 412-3) that is distinct from the first circular polarization. In some embodiments, the second circular polarization is orthogonal to the first circular polarization (e.g., right-handed and left-handed circular polarizations). The first polarization volume holographic element is configured to receive the third light having the second circular polarization and transmit the third light having the second circular polarization (e.g., PVH 406 transmits light 412-3 having the second circular polarization).

In some embodiments, the partial reflector is capable of reflecting a second portion of the first light having the first circular polarization as fourth light having the second circular polarization (e.g., partial reflector 404 reflects light 512-2 in FIG. 5C). The first portion of the first light is mutually exclusive to the second portion of the first light. In some embodiments, the partial reflector is a 50:50 mirror (e.g., the partial reflector reflects 50% of light impinging thereon and transmits 50% of light impinging thereon).

In some embodiments, the partial reflector capable of transmitting a second portion of the second light having the first circular polarization light (e.g., partial reflector 404 transmits light 412-1 in FIG. 5C). The first portion of the second light is mutually exclusive to the second portion of the second.

In some embodiments, the partial reflector has a flat surface facing the volume holographic element (e.g., partial reflector 404 in FIG. 5A is flat).

In some embodiments, the partial reflector has a curved surface facing the volume holographic element (e.g., partial reflector 404 in FIG. 4A is curved). In some embodiments, the curved surface of the partial reflector causes focusing of the third light (e.g., light 412-3 in FIG. 4B). In some embodiments, the curved surface of the partial reflector causes refraction of the first portion of the first light (e.g., light 412-1).

In some embodiments, the first polarization volume holographic element is configured to function as a focusing mirror to the first portion of the first light having the first circular polarization (e.g., PVH 406 is a reflective lens focusing light 412-3 in FIG. 4B).

In some embodiments, at least a center portion of the partial reflector is separated from the first polarization volume holographic element (e.g., partial reflector 404 is separated from PVH 406 in FIG. 4A). In some embodiments, the center portion of the partial reflector is not in contact with the first polarization volume holographic element.

In some embodiments, the optical assembly further includes an optically transparent substrate having a first surface and a second surface that is opposite to the first surface (e.g., optical assembly 405 includes substrate 407 between PVH 406 and partial reflector 404 in FIG. 4A). The first surface being in contact with the partial reflector and the second surface being in contact with the first polarization volume holographic element (e.g., substrate 407 has a curved surface in contact with partial reflector 404 and a flat surface in contact with PVH 406).

In some embodiments, the polarization volume holographic element includes a layer of liquid crystal material formed on the second surface of the optically transparent substrate.

In some embodiments, each of the first surface and the second surface of the optically transparent substrate is a flat surface, and wherein the layer of liquid crystal material is configured to function as a focusing mirror to the first portion of the first light having the first circular polarization.

In some embodiments, the partial reflector is optically coupled with a polarization plate configured to convert a polarization of incoming light to the first light having the first circular polarization (e.g., partial reflector 404 is optically coupled with polarization plate 410 in FIG. 4A). In some embodiments, the polarization plate is a quarter-wave plate configured to convert light having a linear polarization to the first light having the first circular polarization.

In some embodiments, the optical assembly is configured to converge or diverge light having the first circular polarization and transmit light having the second circular polarization without converging or diverging the light having the second circular polarization (e.g., light 414 having the second circular polarization is transmitted through partial reflector 404 and PVH 406 without being converged or diverged in FIG. 4B).

In some embodiments, the optical assembly is configured to converge or diverge light of a first wavelength and transmit light of a second wavelength distinct from the first wavelength without converging or diverging the light of the second wavelength (e.g., light 414 having the second wavelength is transmitted through partial reflector 404 and PVH 406 without being converged or diverged in FIG. 4B).

In some embodiments, the optical assembly further includes a second polarization volume holographic element (e.g., PVH 506 in FIG. 5A) optically coupled with the partial reflector (e.g., partial reflector 404). The second polarization volume holographic element is configured to receive the first light having the first circular polarization and transmit the first light having the first circular polarization (e.g., light 412-1 in FIG. 5C), and receive the fourth light having the second circular polarization and reflect the fourth light having the second circular polarization without converting the second polarization as fifth light having the second polarization (e.g., light 512-2 in FIG. 5C).

In some embodiments, the partial reflector is disposed between the second polarization volume holographic element and the first polarization volume holographic element (e.g., partial reflector 404 is located between PVH 406 and PVH 506 in FIG. 5). The partial reflector is further configured to receive the fifth light having the second polarization and transmit a portion of the fifth light having the second polarization. The first polarization volume holographic element is further configured to receive the portion of the fifth light having the second polarization and transmit the portion of the fifth light having the second polarization. In some embodiments, the first polarization volume holographic element is optically coupled with a lens configured to focus light transmitted through the first polarization volume holographic element (e.g., lens 602 in FIG. 6A).

In some embodiments, the first polarization volume holographic element is a first reflective polarization volume hologram lens having a focal distance (e.g., PVH 406 is a reflective lens with a first focal distance in FIG. 5A) and the second polarization volume holographic element is a second reflective polarization volume hologram lens having the same focal distance (e.g., PVH 506 is a reflective lens with a second focal distance in FIG. 5B).

In some embodiments, the first polarization volume hologram lens is configured to focus the light having the second circular polarization to a particular focal point (e.g., on a focal point located on reference plane 408 in FIG. 5A). The second polarization volume hologram lens is configured to focus the light having the second circular polarization to the particular focal point (e.g., on the same focal point located on reference plane 408 in FIG. 5B).

In accordance with some embodiments, a method includes receiving, with a partial reflector, first light having a first circular polarization and transmitting, through the partial reflector, a first portion of the first light having the first circular polarization (e.g., FIGS. 4A and 4B). The method further includes receiving, with a first polarization volume holographic element optically coupled with the partial reflector, the first portion of the first light having the first circular polarization and reflecting the first portion of the first light having the first circular polarization (in some cases, without converting the first polarization) as second light having the first circular polarization. The method further includes receiving, with the partial reflector, the second light having the first polarization and reflecting, with the partial reflector, a first portion of the second light having the first polarization as third light having a second circular polarization that is distinct from the first circular polarization. The method further includes receiving, with the first polarization volume holographic element, and transmitting, through the first polarization volume holographic element, the third light having the second circular polarization.

In some embodiments, the partial reflector is curved (e.g., FIG. 4A). The method includes reflecting, with the partial reflector, the second light having the first polarization includes focusing the second light having the first polarization.

In some embodiments, the first polarization volume holographic element is a first reflective polarization volume hologram lens (e.g., the first polarization volume holographic element converges or diverges light having a particular polarization) (e.g., FIG. 4A).

In some embodiments, the method includes reflecting, with the partial reflector, a second portion of the first light having the first circular polarization as fourth light having the second circular polarization; receiving, with a second polarization volume holographic element optically coupled with the partial reflector, the fourth light having the second circular polarization; reflecting, with the second polarization volume holographic element, the fourth light having the second circular polarization (in some cases, without converting the second polarization) as fifth light having the second circular polarization; receiving, with the partial reflector, the fifth light having the second circular polarization and transmitting a portion of the fifth light having the second circular polarization; and receiving, with the first polarization volume holographic element, the portion of the fifth light having the second circular polarization and transmitting the portion of the fifth light having the second circular polarization (e.g., FIG. 5C).

In some embodiments, a display device includes any of the optical assemblies (or any embodiment of the optical assemblies) described herein (e.g., display device 400 in FIG. 4A).

In some embodiments, the display device is included in a headset (e.g., display device 100 in FIG. 1).

In accordance with some embodiments, a lens assembly includes a first optical element on a first side of the lens assembly and a second optical element on a second side of the lens assembly (e.g., optical assembly 405 includes partial reflector 404 and PVH 406 in FIG. 4A). The first optical element is separated from the first optical element by a first distance (e.g., distance d1 in FIG. 5A). The lens assembly is configured to receive first light (e.g., light 412 in FIG. 4A) having first circular polarization and propagating in a first direction on the first side, and to output a first portion of the first light as second light on the second side. The second light has second circular polarization opposite to the first circular polarization and propagates in a second direction different from the first direction. The lens assembly is further configured to form at least one fold in an optical path of the second light between the first side and the second side.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical assembly, comprising:
a partial reflector and a first polarization volume holographic element optically coupled with the partial reflector, wherein:
the partial reflector is capable of:
receiving first light having a first circular polarization; and
transmitting a first portion of the first light having the first circular polarization;
the first polarization volume holographic element is configured to:
receive the first portion of the first light having the first circular polarization and reflect the first portion of the first light having the first circular polarization as second light having the first circular polarization;
the partial reflector is configured to:
receive the second light having the first circular polarization and reflect a first portion of the second light having the first circular polarization as third light having a second circular polarization that is distinct from the first circular polarization; and
the first polarization volume holographic element is configured to:
receive the third light having the second circular polarization and transmit the third light having the second circular polarization.

2. The optical assembly of claim 1, wherein the partial reflector is capable of reflecting a second portion of the first light having the first circular polarization as fourth light having the second circular polarization.

3. The optical assembly of claim 2, further comprising:
a second polarization volume holographic element optically coupled with the partial reflector, the second polarization volume holographic element configured to:
receive the first light having the first circular polarization and transmit the first light having the first circular polarization; and
receive the fourth light having the second circular polarization and reflect the fourth light having the second circular polarization as fifth light having the second polarization.

4. The optical assembly of claim 3, wherein the partial reflector is disposed between the second polarization volume holographic element and the first polarization volume holographic element and is further configured to receive the fifth light having the second polarization and transmit a portion of the fifth light having the second polarization, and wherein the first polarization volume holographic element is further configured to receive the portion of the fifth light having the second polarization and transmit the portion of the fifth light having the second polarization.

5. The optical assembly of claim 4, wherein the first polarization volume holographic element is a first reflective polarization volume hologram lens having a focal distance and the second polarization volume holographic element is a second reflective polarization volume hologram lens having the same focal distance.

6. The optical assembly of claim 5, wherein the first polarization volume hologram lens is configured to focus the light having the second circular polarization to a particular focal point and the second polarization volume hologram lens is configured to focus the light having the second circular polarization to the particular focal point.

7. The optical assembly of claim 1, wherein the partial reflector is configured to transmit a second portion of the second light having the first circular polarization.

8. The optical assembly of claim 1, wherein the partial reflector has a flat surface facing the volume holographic element.

9. The optical assembly of claim 1, wherein the partial reflector has a curved surface facing the volume holographic element.

10. The optical assembly of claim 1, wherein the first polarization volume holographic element is configured to function as a focusing mirror to the first portion of the first light having the first circular polarization.

11. The optical assembly of claim 1, further comprising an optically transparent substrate having a first surface and a second surface that is opposite to the first surface, the first surface being in contact with the partial reflector and the second surface being in contact with the first polarization volume holographic element.

12. The optical assembly of claim 11, wherein the polarization volume holographic element includes a layer of liquid crystal material formed on the second surface of the optically transparent substrate.

13. The optical assembly of claim 12, wherein each of the first surface and the second surface of the optically transparent substrate is a flat surface, and wherein the layer of liquid crystal material is configured to function as a focusing mirror to the first portion of the first light having the first circular polarization.

14. The optical assembly of claim 1, wherein the partial reflector is optically coupled with a polarization plate configured to convert a polarization of incoming light to the first circular polarization.

15. The optical assembly of claim 1, wherein the optical assembly is configured to converge or diverge light having the first circular polarization and transmit light having the second circular polarization without converging or diverging the light having the second circular polarization.

16. The optical assembly of claim 1, wherein the optical assembly is configured to converge or diverge light of a first wavelength and transmit light of a second wavelength distinct from the first wavelength without converging or diverging the light of the second wavelength.

17. A display device including the optical assembly of claim 1.

18. The display device of claim 17, wherein the display device is included in a headset.

19. A method, comprising:
receiving, with a partial reflector, first light having a first circular polarization;
transmitting, through the partial reflector, a first portion of the first light having the first circular polarization;
receiving, with a first polarization volume holographic element optically coupled with the partial reflector, the first portion of the first light having the first circular polarization and reflecting the first portion of the first light having the first circular polarization as second light having the first circular polarization;
receiving, with the partial reflector, the second light having the first polarization;
reflecting, with the partial reflector, a first portion of the second light having the first polarization as third light having a second circular polarization that is distinct from the first circular polarization; and
receiving with the first polarization volume holographic element and transmitting through the first polarization volume holographic element the third light having the second circular polarization.

20. The method of claim 19, including:
reflecting, with the partial reflector, a second portion of the first light having the first circular polarization as fourth light having the second circular polarization;
receiving, with a second polarization volume holographic element optically coupled with the partial reflector, the fourth light having the second circular polarization;
reflecting, with the second polarization volume holographic element, the fourth light having the second circular polarization as fifth light having the second circular polarization;
receiving, with the partial reflector, the fifth light having the second circular polarization and transmitting a portion of the fifth light having the second circular polarization; and
receiving, with the first polarization volume holographic element, the portion of the fifth light having the second circular polarization and transmitting the portion of the fifth light having the second circular polarization.

21. An optical assembly, comprising:
a first optical element on a first side of a lens assembly and a second optical element on a second side of the lens assembly, the first optical element being separated from the second optical element by a first distance;
wherein the optical assembly is configured to receive first light having first circular polarization and propagating in a first direction on the first side, and to output a first portion of the first light as second light on the second side, the second light having second circular polarization opposite to the first circular polarization and propagating in a second direction different from the first direction; and
wherein the optical assembly is further configured to form at least one fold in an optical path of the second light between the first side and the second side.

22. The optical assembly of claim 21, further comprising one or more lenses positioned between the first optical element and the second optical element.

* * * * *